United States Patent
Ninomiya et al.

(10) Patent No.: US 11,418,134 B2
(45) Date of Patent: Aug. 16, 2022

(54) VIBRATION TYPE MOTOR FOR GUIDING MOVEMENT OF A FRICTION MEMBER, AND LENS APPARATUS AND ELECTRONIC APPARATUS INCLUDING SAID MOTOR

(71) Applicant: CANON KABUSHIKI KAISHA, Tokyo (JP)

(72) Inventors: Shunsuke Ninomiya, Fujisawa (JP); Ryo Yamasaki, Tokyo (JP); Yasufumi Yamamoto, Kawasaki (JP); Mai Nakabayashi, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 884 days.

(21) Appl. No.: 16/198,016

(22) Filed: Nov. 21, 2018

(65) Prior Publication Data

US 2019/0165697 A1 May 30, 2019

(30) Foreign Application Priority Data

Nov. 27, 2017 (JP) .............................. JP2017-226466

(51) Int. Cl.
*H02N 2/02* (2006.01)
*G02B 7/02* (2021.01)
(Continued)

(52) U.S. Cl.
CPC .............. *H02N 2/026* (2013.01); *G02B 7/02* (2013.01); *H02N 2/0055* (2013.01); *H02N 2/04* (2013.01)

(58) Field of Classification Search
CPC ........ H02N 2/026; H02N 2/0055; H02N 2/04; G02B 7/02; G02B 7/08
See application file for complete search history.

(56) References Cited

U.S. PATENT DOCUMENTS

2009/0153966 A1* 6/2009 Matsumoto ............... B08B 7/02
359/508
2011/0031847 A1 2/2011 Sakamoto
(Continued)

FOREIGN PATENT DOCUMENTS

CN 101257264 A 9/2008
CN 102270941 A 12/2011
(Continued)

OTHER PUBLICATIONS

Aug. 30, 2019 Russian Search Report, which is enclosed with an English Translation, that issued in Russian Patent Application No. 2018141392.
(Continued)

*Primary Examiner* — Emily P Pham
(74) *Attorney, Agent, or Firm* — Cowan, Liebowitz & Latman, P.C.

(57) ABSTRACT

A vibration type motor includes first and second vibrators, a friction member configured to contact the first and second vibrators, a pressure member configured to press the first and second vibrators against the friction member, and first and second guide members configured to guide a relative movement between the first and second vibrators and the friction member. The first and second vibrators are spaced in a direction different from a relative movement direction between the first and second vibrators and the friction member. The first and the second guide member are provided between the first vibrator and the second vibrator in a direction different from the relative movement direction. A pressure center of a pressure applied to the first vibrator and the second vibrator by the pressure member is located between the first guide member and the second guide member.

11 Claims, 13 Drawing Sheets

(51) Int. Cl.
   *H02N 2/00*  (2006.01)
   *H02N 2/04*  (2006.01)

(56) References Cited

U.S. PATENT DOCUMENTS

| | | | |
|---|---|---|---|
| 2014/0191691 A1* | 7/2014 | Kudo | H02N 2/008 318/116 |
| 2014/0293463 A1 | 10/2014 | Yamanaka et al. | |
| 2017/0082828 A1* | 3/2017 | Sumioka | G02B 7/04 |
| 2017/0317614 A1 | 11/2017 | Shiono | |

FOREIGN PATENT DOCUMENTS

| | | |
|---|---|---|
| CN | 104104265 A | 10/2014 |
| CN | 107342703 A | 11/2017 |
| JP | 2001-086777 A | 3/2001 |
| JP | 2008-172995 A | 7/2008 |
| JP | 2015-065809 A | 4/2015 |
| JP | 2017-169427 A | 9/2017 |
| JP | 2017-173502 A | 9/2017 |
| JP | 2017-198925 A | 11/2017 |
| KR | 10-2017-0123243 A | 11/2017 |
| RU | 2024904 C1 | 12/1994 |
| WO | 2011/072094 A2 | 6/2011 |

OTHER PUBLICATIONS

British Examination Search Report dated May 14, 2019, which is enclosed, that issued in the corresponding U.K. Patent Application No. GB1819104.9.

Indian Search Report dated Jun. 9, 2021, which is enclosed, that issued in the corresponding Indian Patent Application No. 201844043960.

Jul. 5, 2021 Chinese Office Action, which is enclosed with an English Translation, that issued in Chinese Patent Application No. 201811397610.4.

Dec. 21, 2021 Korean Notice of Allowance, which is enclosed with an English Translation, that issued in Korean Patent Application No. 10-2018-0143081.

The above document was cited in a May 27, 2022 German Office Action, a copy of which is enclosed with an English Translation, that issued in German Patent Application No. 102018127392.4.

* cited by examiner

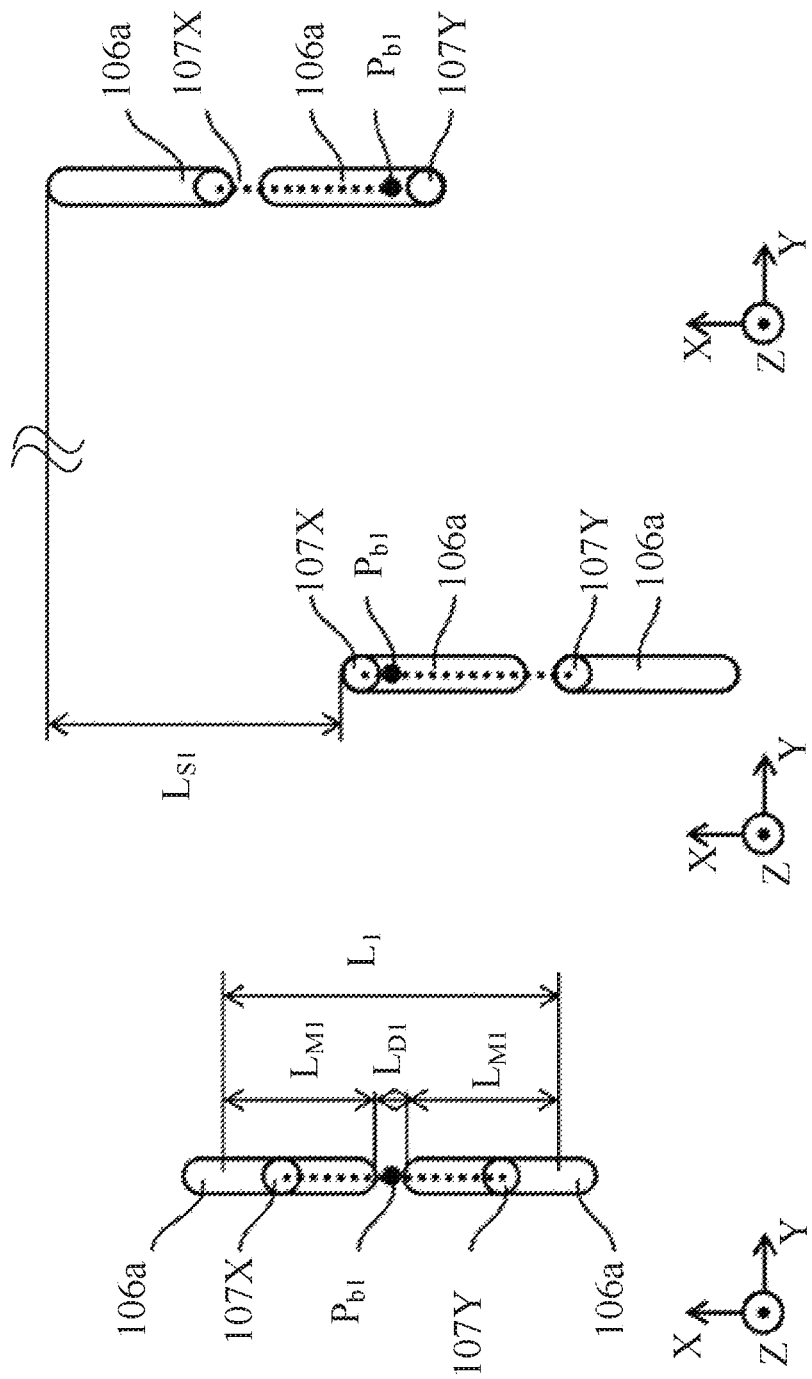

VIBRATION TYPE MOTOR FOR GUIDING MOVEMENT OF A FRICTION MEMBER, AND LENS APPARATUS AND ELECTRONIC APPARATUS INCLUDING SAID MOTOR

BACKGROUND OF THE INVENTION

Field of the Invention

The present invention relates to a vibration type motor applicable to a lens apparatus etc.

Description of the Related Art

Japanese Patent Laid-Open No. ("JP") 2015-65809 discloses an ultrasonic motor that includes a vibrator having a piezoelectric element and an elastic body having a protrusion, a friction member configured to move relative to the vibrator due to a high-frequency vibration of the vibrator, and a pressure member configured to press the vibrator against the friction member. The ultrasonic motor disclosed in JP 2015-65809 further includes guide means configured to guide the relative movement between the vibrator and the friction member while receiving the reaction force of the pressure applied to the vibrator. The guide means includes a guide member and a guide groove, and the guide member is engaged with the guide groove and rolls on the guide groove, thereby guiding the relative movement between the vibrator and the friction member.

However, the ultrasonic motor disclosed in JP 2015-65809 applies the pressure of the pressure member to the vibrator inside the three guide members over the entire driving range. Thus, the occupancy range of the guide groove is long in the moving direction of the ultrasonic motor. As a result, the ultrasonic motor in the moving direction becomes larger, and it is difficult to realize a compact ultrasonic motor.

SUMMARY OF THE INVENTION

The present invention provides a compact vibration type motor, a lens apparatus, and an electronic apparatus.

A vibration type motor according to one aspect of the present invention includes a first vibrator and a second vibrator, a friction member configured to contact the first vibrator and the second vibrator, a pressure member configured to press the first vibrator and the second vibrator against the friction member, and a first guide member and a second guide member configured to guide a relative movement between the first and second vibrators and the friction member. The first vibrator and the second vibrator are spaced in a direction different from a relative movement direction between the first and second vibrators and the friction member. The first guide member and the second guide member are provided between the first vibrator and the second vibrator in a direction different from the relative movement direction. A pressure center of a pressure applied to the first vibrator and the second vibrator by the pressure member is located between the first guide member and the second guide member.

A lens apparatus according to another aspect of the present invention includes the above vibration type motor, and an optical system driven by the vibration type motor. An electronic apparatus according to still another aspect of the present invention includes the above vibration type motor, and a target driven by the vibration type motor.

Further features of the present invention will become apparent from the following description of exemplary embodiments with reference to the attached drawings.

BRIEF DESCRIPTION OF THE DRAWINGS

FIGS. 4A to 4C are explanatory views of a relationship between a moving range and a length of the guide groove according to the first embodiment.

DESCRIPTION OF THE EMBODIMENTS

Figure 1A:
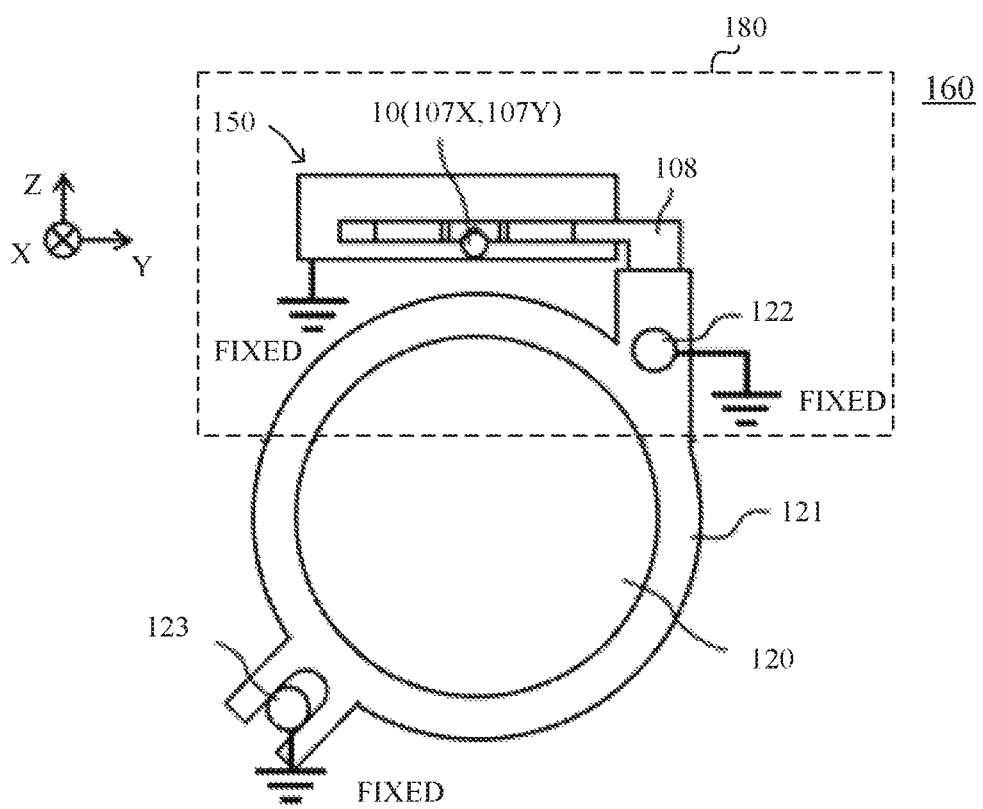
FIGS. 1A to 1C are structural views of a lens apparatus including an ultrasonic motor according to a first embodiment.

Referring now to the accompanying drawings, a detailed description will be given of embodiments according to the present invention. In each figure, the same reference numerals are given to the same elements, and a duplicate description thereof will be omitted.

First Embodiment

A description will now be given of a first embodiment according to the present invention. This specification sets an X direction to a moving direction in which the following vibrator and friction member move relative to each other, and a Z direction to a pressing direction for pressing the vibrator against the friction member. In the Z direction, +Z direction is set to a direction from the following vibrator to the friction member, and −Z direction is set to a direction from the friction member to the vibrator. A Y direction is set to an orthogonal direction orthogonal to each of the X direction and the Z direction.

Figure 1B:
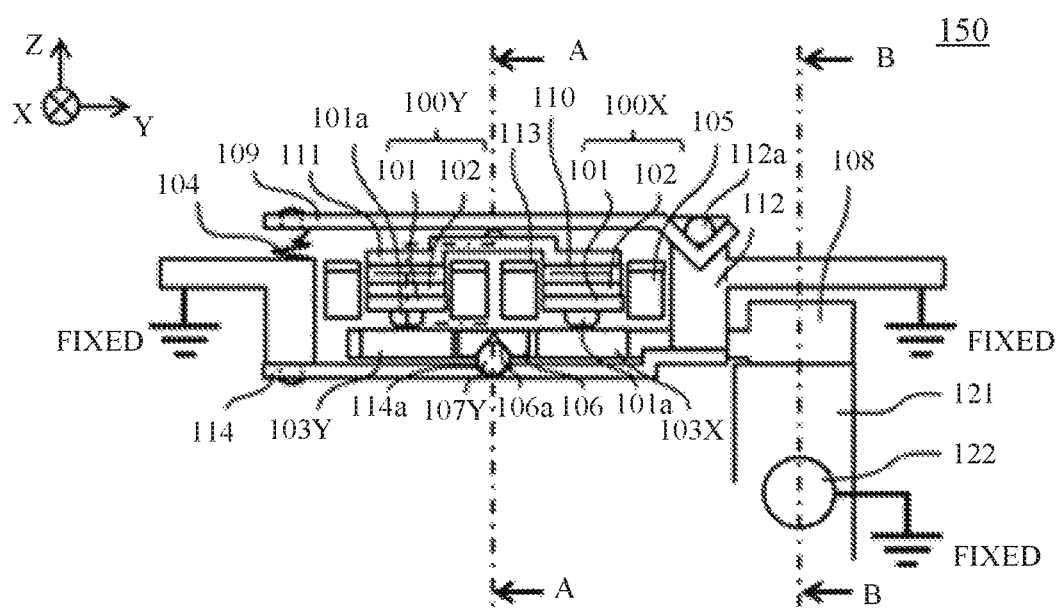
Figure 1C:
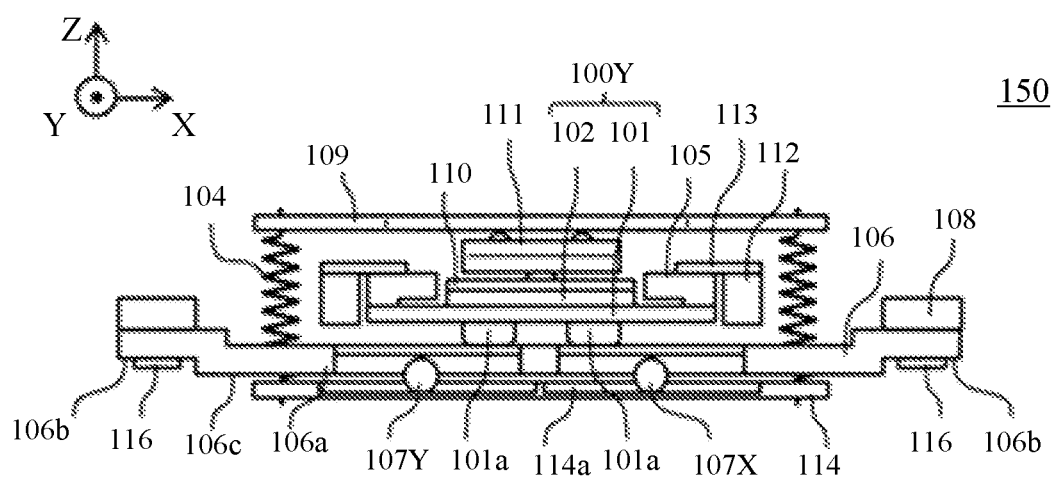

Referring now to FIGS. 1A to 1C, a description will be given of a configuration of an ultrasonic motor 150 as a vibration type motor according to this embodiment and a lens apparatus 160 including the ultrasonic motor 150. The ultrasonic motor 150 constitutes part of a lens driving unit that drives a lens 120 in the lens apparatus 160. FIGS. 1A to 1C illustrate the configuration of the ultrasonic motor 150 and the lens apparatus 160 including the ultrasonic motor 150. FIG. 1A is a front view of the lens apparatus 160, FIG. 1B is a front view of the ultrasonic motor 150 enlarging a region 180 in FIG. 1A, and FIG. 1C is a sectional view taken along a line A-A in FIG. 1B.

Each of a vibrator (first vibrator) 100X and a vibrator (second vibrator) 100Y includes a vibration plate 101 having two protrusions 101a and a piezoelectric element 102 that vibrates at a high frequency. The piezoelectric element 102 vibrates at a high frequency (ultrasonically) when an unillustrated power supply applies the voltage. The piezoelectric element 102 is fixed onto the vibration plate 101 by the adhesion or other means, and the high frequency vibration of the piezoelectric element 102 excites the high frequency vibrations in the entire corresponding vibrators 100X and 100Y. Each of a friction member (first friction member) 103X and a friction member (second friction member) 103Y contact a corresponding one of the vibrators 100X and 100Y and is fixed onto a base member 108 by a screw etc. The vibrators 100X and 100Y are fixed onto a holder 105 by the adhesion and other means. The holder 105 is fixed onto a fixing member 112 by the adhesion or other means via a coupling plate 113. However, this embodiment is not limited to fixing these members by screws or adhesions, but is applicable to a fixing method using other means.

A pressure member 104 presses each of the vibrators 100X and 100Y against the corresponding one of the friction members 103X and 103Y and presses the vibrator 100 through an upper pressure plate 109, a lower pressure plate 111, and an elastic plate 110. The pressure member 104 connects the upper pressure plate 109 and the fixed side plate (fixed plate) 114 at two locations and provides a pressure so as to press the vibrators 100X and 100Y against the friction members 103X and 103Y.

According to this embodiment, the ultrasonic motor 150 includes two vibrators 100X and 100Y and two friction members 103X and 103Y contacting them. The vibrators 100X and 100Y are spaced from each other and arranged in parallel in a direction (Y direction) orthogonal to the pressure direction (Z direction). Similarly, the friction members 103X and 103Y are also arranged in parallel in the direction (Y direction) orthogonal to the pressure direction (Z direction). Reference numerals for two parallel pairs arranged in the Y direction as the same members may be omitted in each drawing for simpler views.

The upper pressure plate 109 is engaged with the fixing member 112 about an engagement portion 112a of the fixing member 112 as a rotation center and contacts a convex portion on the lower pressure plate 111 to transmit the pressure of the pressure member 104 to it. The lower pressure plate 111 is disposed across the tops of the vibrators 100X and 100Y. An elastic plate 110 is disposed between the lower pressure plate 111 and each of the piezoelectric elements 102 in the vibrators 100X and 100Y. The elastic plate 110 prevents the pressure part of the lower pressure plate 111 and the piezoelectric elements 102 from directly contacting each other, and protects the piezoelectric elements 102 from damage.

The fixed side plate 114 is fixed onto the fixing member 112 with unillustrated screws or the like. A movable side plate (guide plate) 106 is fixed onto the base member 108 with a screw 116. However, the fixing method of these members is not limited to this example. Since the friction members 103X and 103Y are also fixed onto the base member 108, the movable side plate 106 is integrated with the friction members 103X and 103Y. A fixed surface 106b fixed by the screw 116 on the movable side plate 106 is lower to a position closer to the base member 108 than a surface 106c on which a movable side guide groove (first groove) 106a is provided. Therefore, when the movable side plate 106 moves relative to the fixed side plate 114, the screw 116 does not interfere with the fixed side plate 114 and the movable side plate 106 can be smaller in the moving direction (X direction). The base member 108 onto which the friction members 103X and 103Y and the movable side plate 106 are fixed is located on the vibrators 100X and 100Y side (+Z direction) of the friction members 103X and 103Y and the movable side plate 106. The base member 108 is thus provided so as to overlap the vibrator 100 in the pressure direction (Z direction) and can be made smaller in the pressure direction (Z direction) than the base member 108 provided on the opposite side of the vibrators 100X and 100Y.

The fixed side plate 114 has two V-shaped fixed side guide grooves (second grooves) 114a. The movable side plate 106 also has two V-shaped movable side guide grooves 106a. The movable side guide groove 106a on the movable side plate 106 and the fixed side guide groove 114a on the fixed side plate 114 are opposed to each other. A spherical guide member (first guide member) 107X and a spherical guide member (second guide member) 107Y guide the relative movement between the vibrators 100X and 100Y and the friction members 103X and 103Y. The guide members 107X and 107Y are engaged with and held by the movable side guide groove 106a and the fixed side guide groove 114a. In other words, the movable side plate 106 contacts the guide members 107X and 107Y. This configuration linearly guides the movable side plate 106 and the fixed side plate 114 in the X direction, as the spherical guide members 107X and 107Y roll on the V-shaped movable side guide groove 106a and fixed side guide groove 114a.

This embodiment sets the friction members 103X and 103Y to movable parts and the vibrators 100X and 100Y to fixed parts in the relative movements between the vibrators 100X and 100Y and the friction members 103X and 103Y. The friction members 103X and 103Y are integrated with the movable side plate 106, and the vibrator 100 is integrated with the fixed side plate 114. Hence, the vibrators 100X and 100Y and the friction members 103X and 103Y are linearly guided by the guide members 107X and 107Y in the X direction as the following moving direction. The movable side plate 106 is provided between the two friction members 103X and 103Y. In addition, the movable side plate 106 is provided so as to overlap at least part of each of the friction members 103X and 103Y when viewed from the direction (Y direction) orthogonal to the pressure direction (Z direction). Thus, the configuration of this embodiment can be smaller than the configuration in which the movable side plate 106 and the friction members 103X and 103Y overlap each other in the pressure direction (Z direction).

The base member 108 is connected to the lens holder 121 tightly in the moving direction (X direction). The lens holder 121 holds the lens 120, is engaged with a first guide bar 122, and thereby is linearly guided so as to be rotatable around the moving direction (X direction). The first guide bar 122 is fixed onto an unillustrated member as labelled "fixed" in FIGS. 1A and 1B. The lens holder 121 is engaged with a second guide bar 123 as a rotation restricting member of the lens holder 121. The second guide bar 123 is also fixed onto an unillustrated member as labelled "fixed" in FIGS. 1A and 1B. Thereby, the lens holder 121 is restricted from rotating, and is linearly guided without rotating in the moving direction (X direction). According to this embodiment, the lens apparatus 160 includes the ultrasonic motor 150, the lens 120, the lens holder 121, the first guide bar 122, and the second guide bar 123.

As described above, the piezoelectric element 102 excites the high-frequency vibration in the vibrators 100X and 100Y. Thereby, an elliptical motion is generated on the projections 101a of the vibration plate 101. The vibrators 100X and 100Y are pressed against and brought into contact with the friction members 103X and 103Y by the pressure member 104. Thus, the elliptical motions of the vibrators 100X and 100Y generates the frictions between the vibrators 100X and 100Y and the friction members 103X and 103Y, so that the vibrators 100X and 100Y and the friction members 103X and 103Y move relative to each other in the moving direction (X direction). The friction members 103X and 103Y move in the moving direction (X direction) relative to the vibrators 100X and 100Y integrated to the fixing member 112. Thus, the base member 108 onto which the friction members 103X and 103Y are fixed, the lens holder 121, and the lens 120 move in the moving direction (X direction). In other words, the lens 120 can be moved in the X direction by the relative movements between the vibrators 100X and 100Y and the friction members 103X and 103Y as the voltage is applied to the piezoelectric element 102.

Figure 2A:
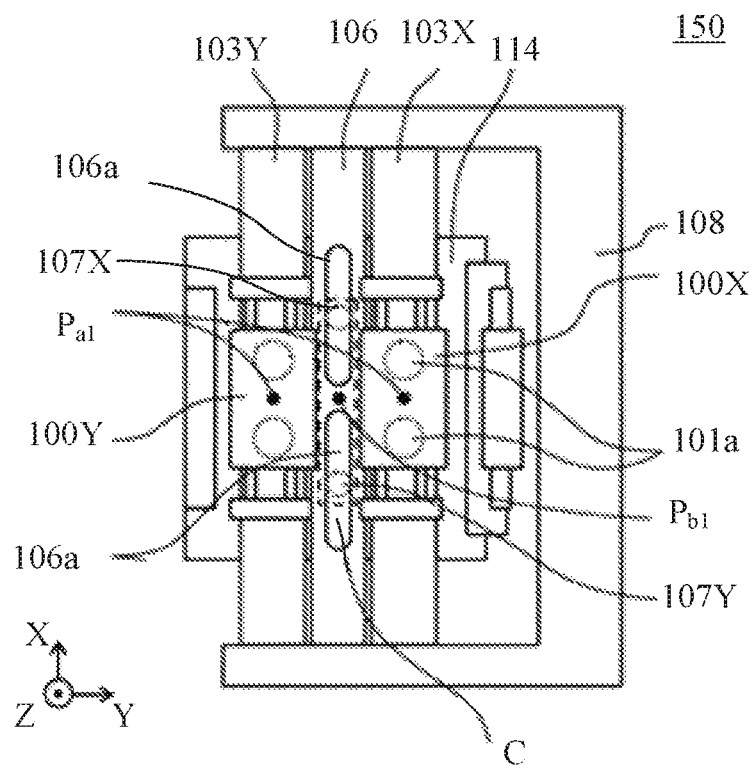
FIGS. 2A to 2C are explanatory views of a position of a guide member according to the first embodiment.
Figure 2B:
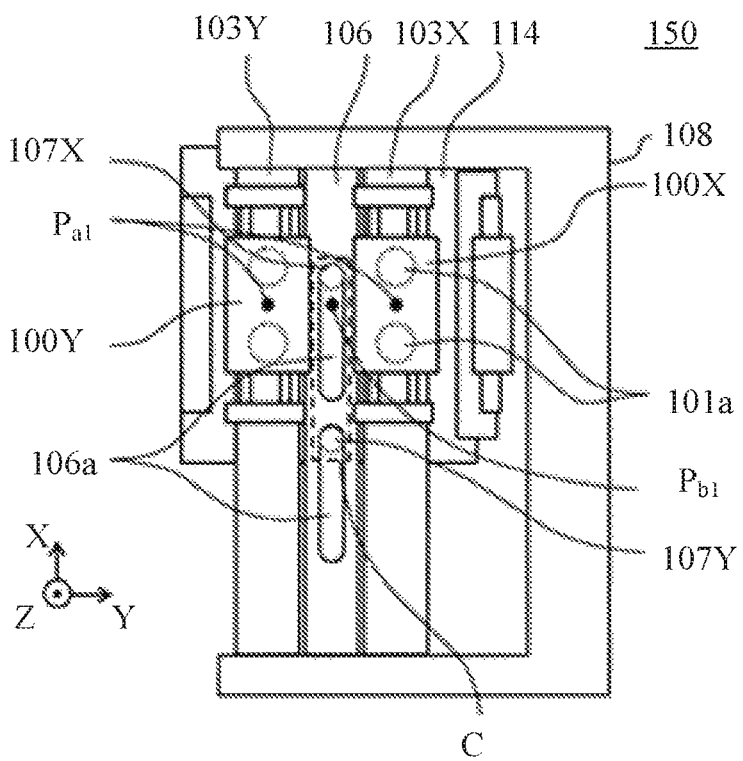
Figure 2C:
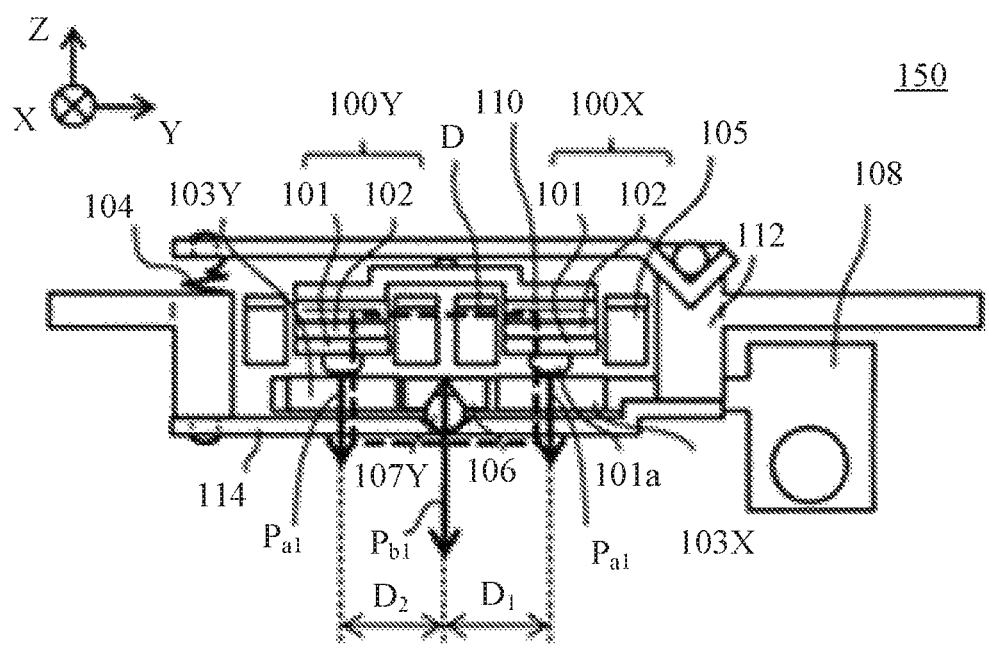

Referring now to FIGS. 2A to 2C, a description will be given of positions of the guide members 107X and 107Y. FIGS. 2A to 2C are explanatory views of the positions of the guide members 107X and 107Y. FIGS. 2A and 2B are top views of principal parts of the ultrasonic motor 150, and FIG. 2C is a front view corresponding to FIG. 19. FIGS. 2A and 2B omit the pressure member 104, the holding member 105, the upper pressure plate 109, the elastic plate 110, the lower pressure plate 111, and the coupling plate 113. FIG. 2A illustrates the movable part, such as the friction members 103X and 103Y, located at the center in the moving range, and FIG. 2B illustrates the movable part located in the moving range at the end in the −X direction.

The vibrators 100X and 100Y are pressed against the friction members 103X and 103Y by the pressure member 104 so that the protrusions 101a of the vibrators 100X and 100Y compressively contact the friction members 103X and 103Y. Thus, a pressure (resultant force) $P_{a1}$ applied to the two protrusions 101a is applied to each of the friction members 103X and 103Y. The ultrasonic motor 150 includes the two vibrators 100X and 100Y and the two friction members 103X and 103Y. The two vibrators 100X and 100Y are arranged in the direction (Y direction) approximately orthogonal to the moving direction (X direction) in which the vibrators 100X and 100Y and the friction members 103X and 103Y move relative to each other. The two friction members 103X and 103Y are also arranged in the direction (Y direction) approximately orthogonal to the moving direction (X direction). A pressure $P_{a1}$ is applied to each of the two friction members 103X and 103Y, and the two friction members 103X and 103Y and the movable side plate 106 are integrated with the base member 108. Thus, a resultant force $P_{b1}$ of the two applied pressures $P_{a1}$ is applied to the friction members 103X and 103Y, the movable side plate 106, and the base member 108.

The guide members 107X and 107Y are aligned with the moving direction (X direction) between the vibrators 100X and 100Y, and the position (pressure center) to which the resultant force $P_{b1}$ of the applied pressures $P_{a1}$ is applied is located inside a range C that encloses the guide members 107X and 107Y. In other words, the resultant force $P_{b1}$ of the pressures $P_{a1}$ applied to the vibrators 100X and 100Y by the pressure member 104 is given to the inside of the guide members 107X and 107Y within the following relative movement range $L_{S1}$ between the vibrators 100X and 100Y and the friction members 103X and 130Y. In other words, the resultant force $P_{b1}$ is given between the guide members 107X and 107Y in the X direction. Thereby, the pressures $P_{a1}$ applied to the vibrators 100X and 100Y can prevent the movable side plate 106 from lifting and stably press it.

This embodiment sets a distance $D_1$ in the orthogonal direction (Y direction) between each of the guide members 107X and 107Y and the vibrator 100X to be smaller than a distance $D_2$ in the orthogonal direction between each of the guide members 107X and 107Y and the vibrator 100Y (Y direction). The configuration according to this embodiment provides the base member 108 fixed to the friction members 103X and 103Y with a moment about the moving direction (X direction) due to the pressure $P_{a1}$ of the pressure member 104. However, the distances $D_1$ and $D_2$ are equal to each other and thus the moments due to the pressures $P_{a1}$ applied to the vibrators 100X and 100Y are well balanced, so that no unnecessary moment is generated in the base member 108.

Figure 3A:
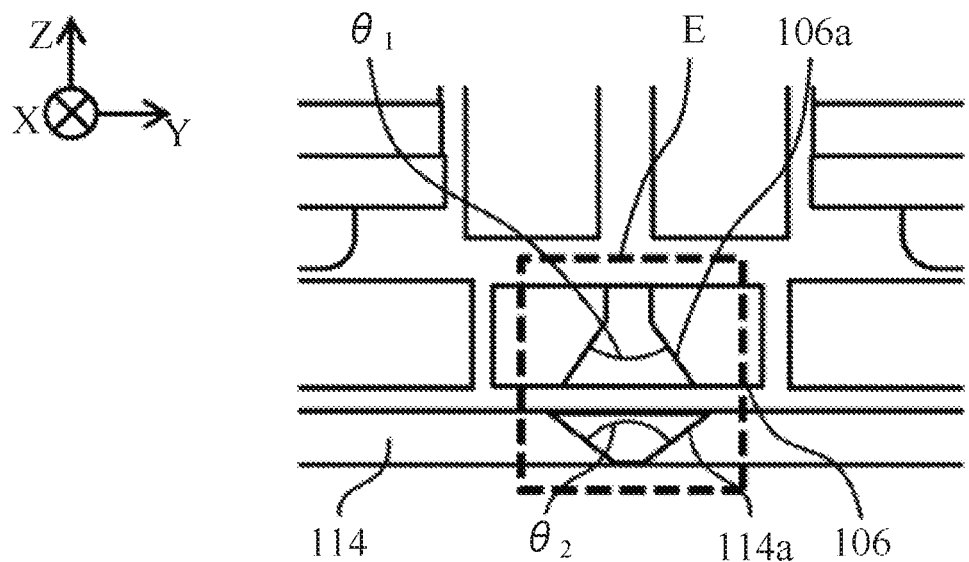
FIGS. 3A and 3B are explanatory views of an angle and a length of a guide groove according to the first embodiment.
Figure 3B:
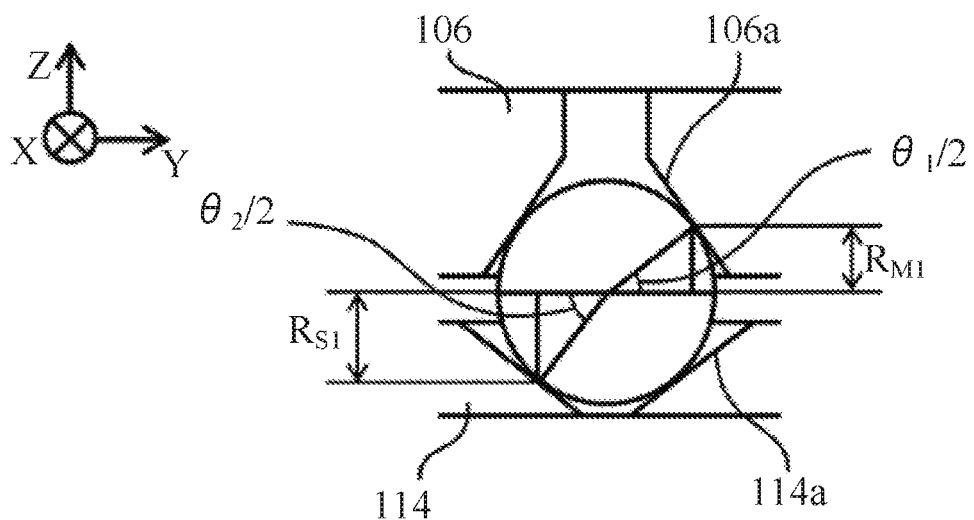

Referring now to FIGS. 3A and 3B, a description will be given of each angle and length of the movable side guide groove 106a and the fixed side guide groove 114a. FIGS. 3A and 3B are explanatory views of the angles and lengths of the movable side guide groove 106a and the fixed side guide groove 114a. FIG. 3A is an enlarged view of a range D in FIG. 2C, and FIG. 3B is an enlarged view of a range E in FIG. 3A. FIG. 3A omits the guide members 107X and 107Y in order to illustrate the angles of the movable side guide groove 106a and the fixed side guide groove 114a. θ1 and θ2 are V-shaped angles in the movable side guide groove 106a and the fixed side guide groove 114a, respectively. As described above, as the movable side plate 106 and the fixed side plate 114 move relative to each other, the spherical guide members 107X and 107Y roll over the movable side guide groove 106a and the fixed side guide groove 114a. At this time, the movable side plate 106 and the fixed side plate 114 move relative to the guide members 107X and 107Y, respectively, and the relative movement amount (rolling amount) is determined based on the angles of the movable side guide groove 106a and the fixed side guide groove 114a.

Assume that $R_{M1}$ is a rolling radius when the guide members 107X and 107Y roll over the movable side guide groove 106a, and $R_{S1}$ is a rolling radius when the guide members 107X and 107Y roll on the fixed side guide groove 114a. Then, the rolling amounts of the movable side plate 106 and the fixed side plate 114 when the guide members 107X and 107Y roll and make one turn become $2\pi R_{M1}$ and $2\pi R_{S1}$. Assume that $L_{S1}$ is a relative movement range of the ultrasonic motor 150 and n is the number of revolutions at which the guide members 107X and 107Y roll when the base member 108 moves over the range $L_{S1}$. In addition, $L_{RM}$ and $L_{RS}$ are lengths of the guide members 107X and 107Y rolling on the movable side guide groove 106 and the fixed side guide groove 114, respectively. Then, the range $L_{S1}$ is calculated as $L_{S1}=L_{RM}+L_{RS}$, the rolling lengths $L_{RM}$ and $L_{RS}$ are $n \times 2\pi R_{M1}$ and $n \times 2\pi R_{S1}$, and these lengths are required for the movable side guide groove 106a and the fixed side guide groove 114a. The rolling radii $R_{M1}$ and $R_{S1}$ are expressed by the following expressions (1A) and (1B), respectively, using the angles θ1 and θ2 of the V-shaped groove.

$$R_{M1}=r \times \sin \theta 1 \qquad (1A)$$

$$R_{S1}=r \times \sin \theta 2 \qquad (1B)$$

In the expressions (1A) and (1B), r is a radius of each of the guide members 107X and 107Y. Thus, larger angles θ1 and θ2 of the V-shaped grooves provide the larger rolling radii $R_{M1}$ and $R_{S1}$ and the longer necessary length of each guide groove. This embodiment sets the angle θ1 of the movable side guide groove 106a in the movable side plate 106 to be smaller than the angle θ2 of the fixed side guide groove 114a in the fixed side plate 114. This configuration can make shorter the movable side guide groove 106a and to configure the movable side guide groove 106a without increasing its size in the relative movement direction of the movable side plate 106.

Referring now to FIGS. 4A to 4C, a description will be given of a relationship between the range $L_{S1}$ and the length of the movable side guide groove 106a. FIGS. 4A to 4C are explanatory views of the relationship between the range $L_{S1}$ and the length of the movable side guide groove 106a. FIGS. 4A to 4C are top views and illustrate only the movable side guide groove 106a, the guide members 107X and 107Y, and the resultant force (pressure center) $P_{b1}$ for simpler views. FIG. 4A illustrates the movable part, such as the friction members 103X and 103Y, located at the center in the range $L_{S1}$. FIGS. 4B and 4C illustrate the positional relationship among the movable side guide groove 106a, the guide members 107X and 107Y and the resultant force (pressure center) $P_{b1}$ when the movable part is located at the end in the −X direction and the end in the +X direction in the range $L_{S1}$.

The friction members 103X and 103Y the base member 108, and the movable side plate 106 are moved in the X direction relative to the fixed pressure member 104, upper pressing plate 109, and the like by the relative movement between the vibrators 100X and 100Y and the friction members 103X and 103Y. Thus, the position of the resultant force (pressure center) $P_{b1}$ is maintained despite the relative movement between the vibrators 100X and 100Y and the friction members 103X and 103Y, and the movable side guide groove 106a moves in the X direction. In response, the guide members 107X and 107Y move in the X direction while rolling on the movable side guide groove 106a. At this time, as described above, the resultant force (pressure center) $P_{b1}$ is located inside the two guide members (rolling members) 107X and 107Y in the entire range of the range $L_{S1}$ and on the dotted line in each of FIGS. 4A to 4C. Now assume that $L_1$ is an occupancy range of the movable side guide groove 106a. Then, the occupancy range $L_1$ is calculated with a length $L_{M1}$ of the two movable side guide grooves 106a and a distance $L_{D1}$ between the two movable side guide grooves 106a, as expressed in the following expression (2).

$$L_1 = 2 \times L_{M1} + L_{D1} \quad (2)$$

The length $L_{M1}$ is determined according to the size of the range $L_{S1}$ as described above. The distance $L_{D1}$ is a minimum machinable distance to form, for example, two groove shapes. This embodiment provides two movable side guide grooves 106a and two fixed side guide grooves 114a to the two guide members 107X and 107Y, but is not limited to this example. For example, one movable side guide groove 106a and one fixed side guide groove 114a may be provided to the two guide members 107.

Figure 5A:
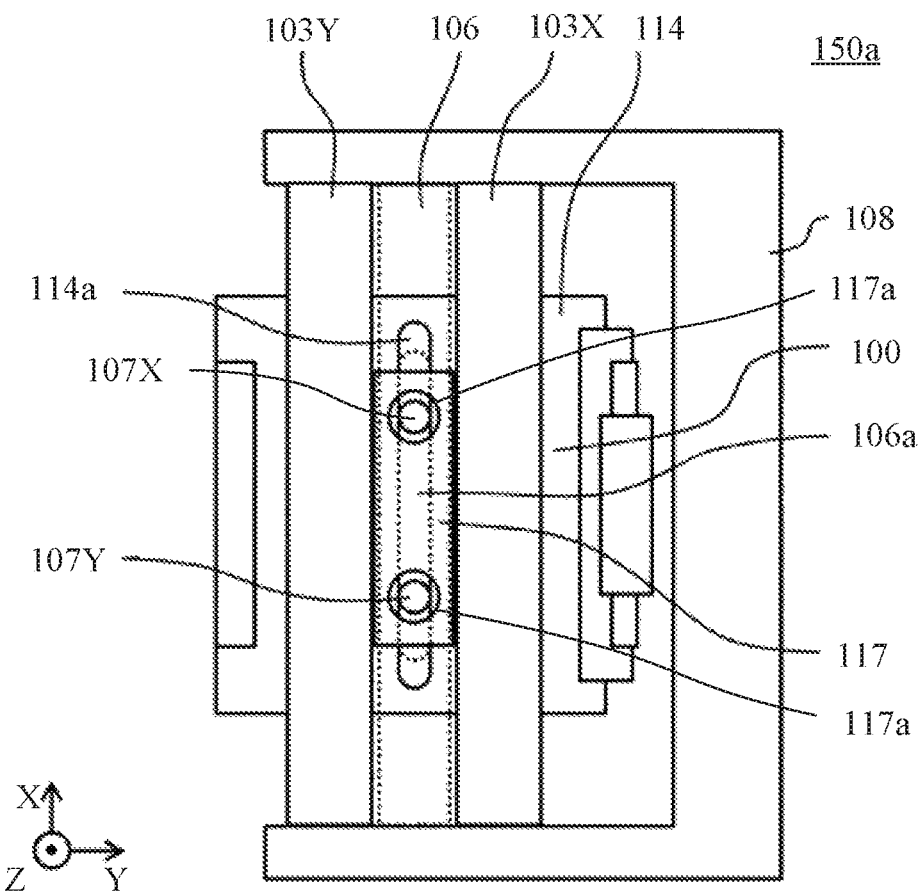
FIGS. 5A and 5B are explanatory views of the guide groove and the guide member according to a variation of the first embodiment.
Figure 5B:
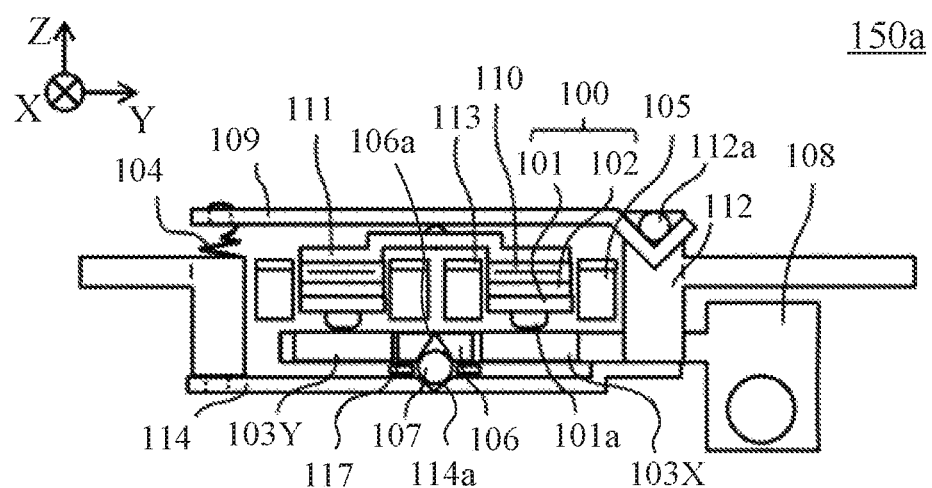

Referring now to FIGS. 5A and 5B, a description will be given of an ultrasonic motor 150a according to a variation of the present embodiment. FIGS. 5A and 5B are explanatory views of the guide members 107X and 107Y, the movable side guide groove 106a, and the fixed side guide groove 114a in the ultrasonic motor 150a according to the variation. FIG. 5A is a top view corresponding to FIG. 2A, and FIG. 5B is a front view corresponding to FIG. 1B. FIG. 5A omits the vibrators 100X and 100Y, and illustrates the movable side plate 106 with a dotted line so as to illustrate the fixed side plate 114 and the fixed side guide groove 114a.

The ultrasonic motor 150a has one movable guide groove 106a and one fixed guide groove 114a. The guide members 107X and 107Y are provided so as to be engaged with the movable side guide groove 106a and the fixed side guide groove 114a, respectively. The holding plate 117 is a plate-shaped member with a hole located between the movable side guide groove 106a and the fixed side guide groove 114a. The guide members 107X and 107Y are provided in the hole portion 117a in the holding plate 117. Thereby, the configuration with only one movable side guide groove 106a and only one fixed side guide groove 114a can keep constant the distance between the guide members 107X and 107Y. One movable side guide groove 106a can eliminate the interval $L_{D1}$ between the two movable side guide grooves 106a, and make narrow the occupancy range $L_1$ of the movable side guide groove 106a.

Figure 8A:
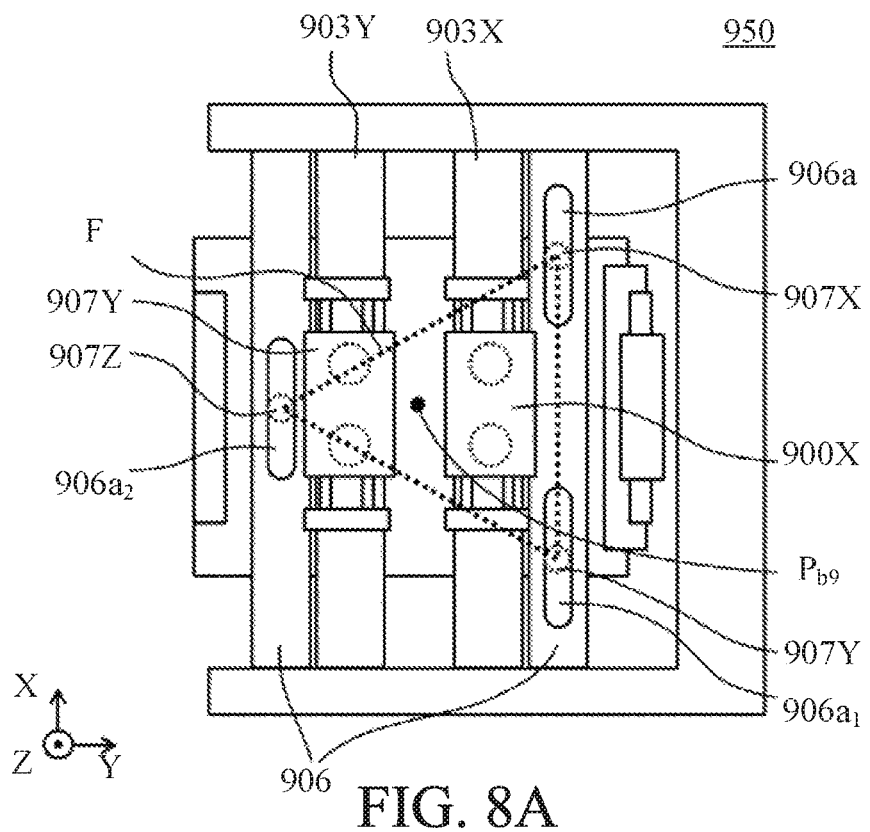
FIGS. 8A and 8B are explanatory views of a position of a guide member according to a comparative example.
Figure 8B:
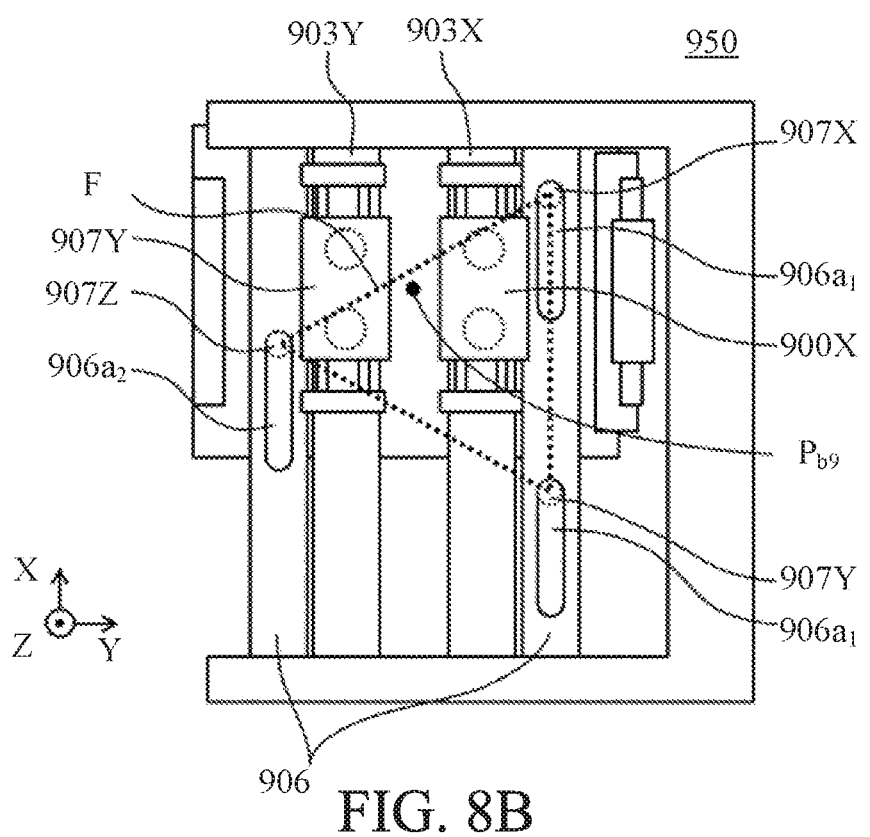
Figure 9A:
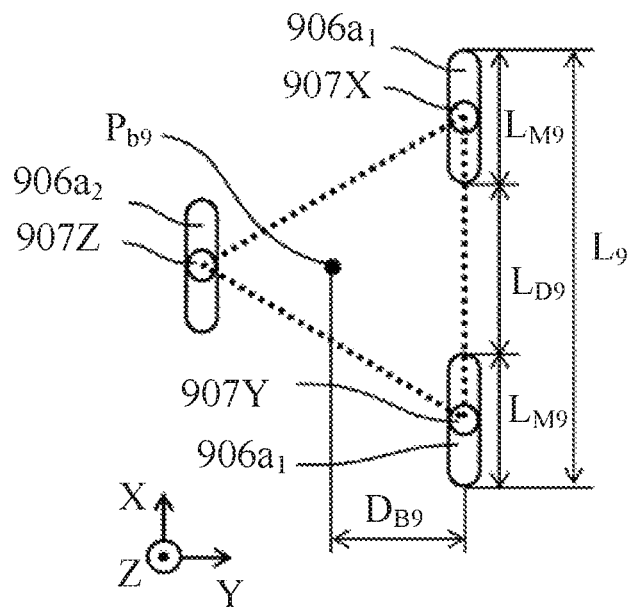
FIGS. 9A to 9C are explanatory views of a relationship between a moving range and a length of a guide groove according to the comparative example.
Figures 9B, 9C:
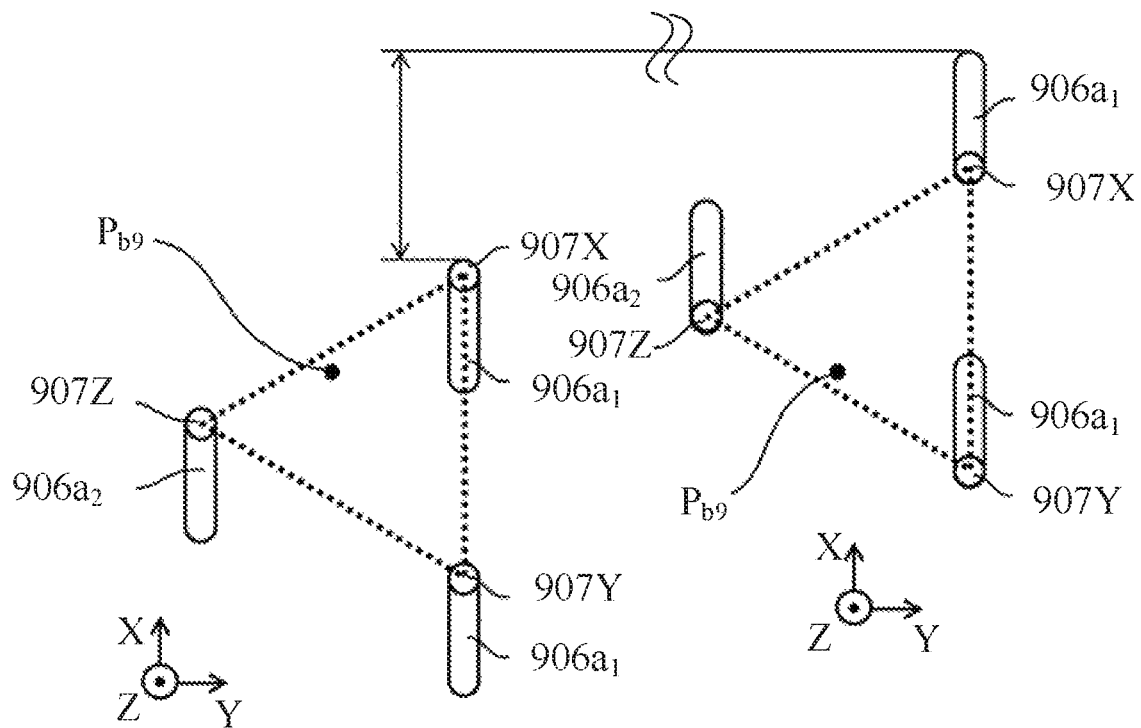

Referring now to FIGS. 8A, 8B, and 9A to 9C, a description will be given of an ultrasonic motor 950 according to a comparative example. FIGS. 8A and 8B are explanatory views of the positions of the guide members 907X, 907Y, and 907Z in the ultrasonic motor 950. FIGS. 8A and 8B are top views corresponding to FIGS. 2A and 2B. FIGS. 9A to 9C are explanatory diagrams of the relationship between the range (relative movement range) $L_{S9}$ of the ultrasonic motor 950 and the length of the movable side guide groove 906a. FIGS. 9A to 9C are top views corresponding to FIGS. 4A to 4C.

The ultrasonic motor 950 has three guide members 907X, 907Y, and 907Z. In addition, the ultrasonic motor 950 has two movable side guide grooves $906a_1$ corresponding to the guide members 907X and 907Y, and one movable side guide groove $906a_2$ corresponding to the guide member 907Z. The ultrasonic motor 950 has three fixed side guide grooves 914a corresponding to the two movable side guide grooves $906a_1$ and one movable side guide groove $906a_2$.

Two movable side guide grooves $906a_1$ are arranged in parallel in the moving direction (X direction), and one movable side guide groove $906a_2$ is provided on the opposite side of the two movable side guide grooves $906a_1$ with respect to the vibrators 900X and 900Y. In order to stably press the vibrators 900X and 900Y against the friction members 903X and 903Y, the movable side guide grooves $906a_1$ and $906a_2$ are provided so that the resultant force (pressure center) $P_{b9}$ is located inside a triangular range F made by connecting the guide members 907X, 907Y, and 907Z in the entire range $L_{S9}$. This comparative example separates the resultant force (pressure center) $P_{b9}$ and the two movable side guide grooves $906a_1$ by a distance $D_{B9}$ in the orthogonal direction (Y direction), and thus needs to separate the two movable side guide grooves $906a_1$ by a distance $L_{D9}$. Therefore, the occupancy range $L_9$ of the movable side guide groove $906a_1$ (expressed by $L_9 = 2 \times L_{M9} + L_{D9}$ using the length $L_{M9}$ of the two movable side guide grooves $906a_1$ and the distance $L_{D9}$ between the two provable side guide grooves $906a_1$).

A description will now be given of the effects of this embodiment. In comparison with the comparative example, this embodiment provides the movable side guide groove 106a between the two vibrators 100X and 100Y, and a distance between the movable side guide groove 106a and the resultant force (pressure center) $P_{b1}$ in the orthogonal direction (Y direction) becomes zero. Therefore, it is necessary to separate them by the distance $L_{D1}$ between the two movable side guide grooves 906a. Alternatively, as described above, the interval $L_{D1}$ can be set to zero when the two movable side guide grooves 106a is reduced to one. Thereby, the occupancy range $L_1$ of the movable side guide groove 106a can be made smaller than that of the comparative example. In other words, this embodiment can reduce the occupation range of the guide groove in the moving direction and realizes a miniaturization in the moving direction.

This embodiment discusses the configuration in which the friction members 103X and 103Y move in the X direction relative to the vibrators 100X and 100Y fixed to the fixing member 112, but is not limited to this embodiment. For example, the friction members 103X and 103Y may be fixed onto the fixing member 112, and the vibrators 100X and 100Y may be relatively movable in the X direction. A wide moving range can reduce the size in the moving direction with the configuration in which the vibrators 100X and 100Y move. This embodiment also discusses the configuration in which the vibrators 100X and 100Y are respectively pressed against the two friction members 103X and 103Y but the vibrators 100X and 100Y may be pressed against a single friction member. One friction member can reduce the cost.

Second Embodiment

Next follows a description of a second embodiment according to the present invention. The first embodiment has discussed the configuration in which the two guide members are located between the two vibrators. On the other hand, this embodiment is different from the first embodiment in that this embodiment provides three guide members with two guide members located between two vibrators. A description of the element common to the first embodiment will be omitted.

Figure 6A:
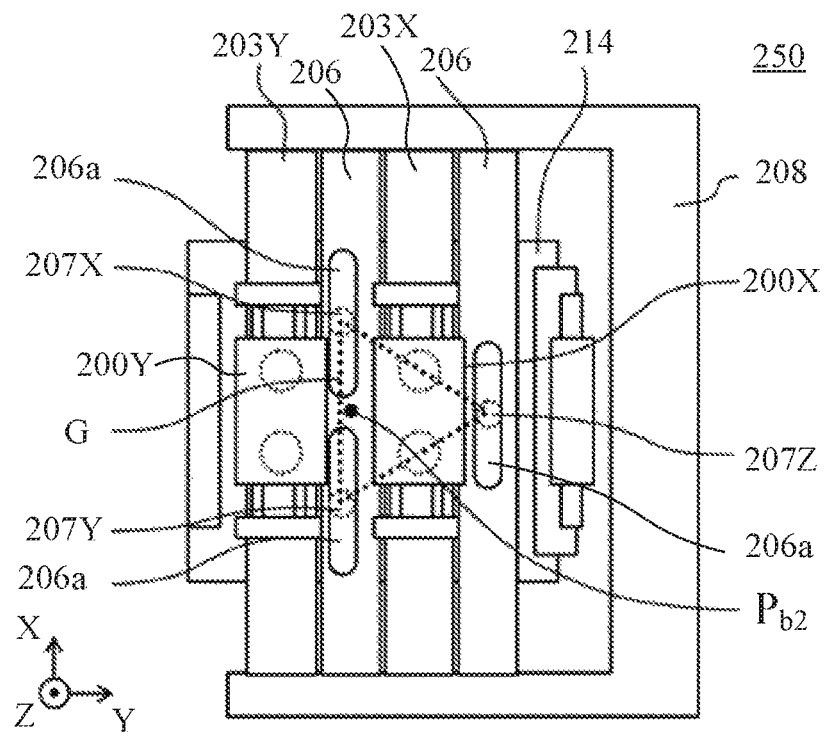
FIGS. 6A to 6C are explanatory views of a position of the guide member according to a second embodiment.
Figure 6B:
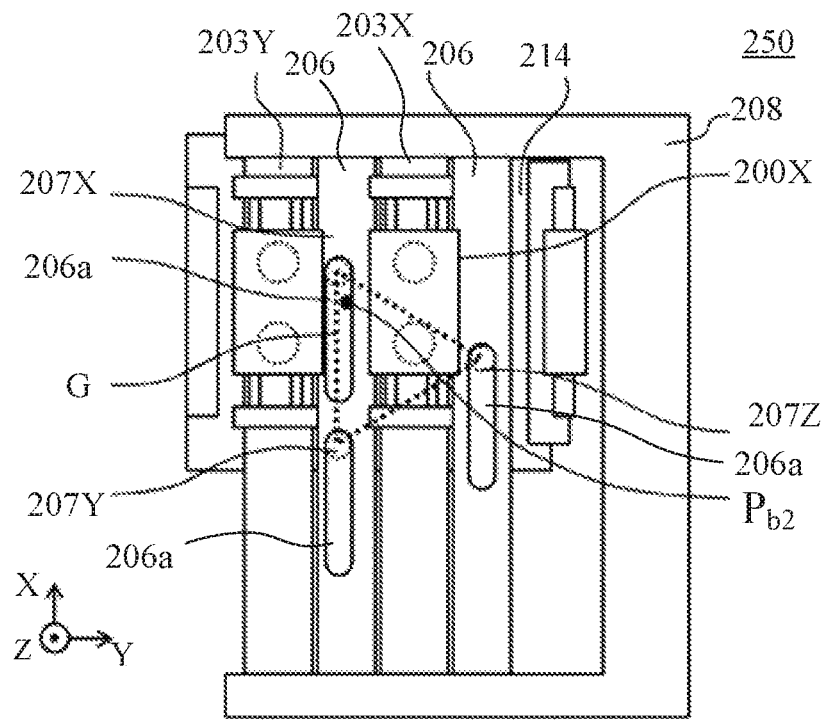
Figure 6C:
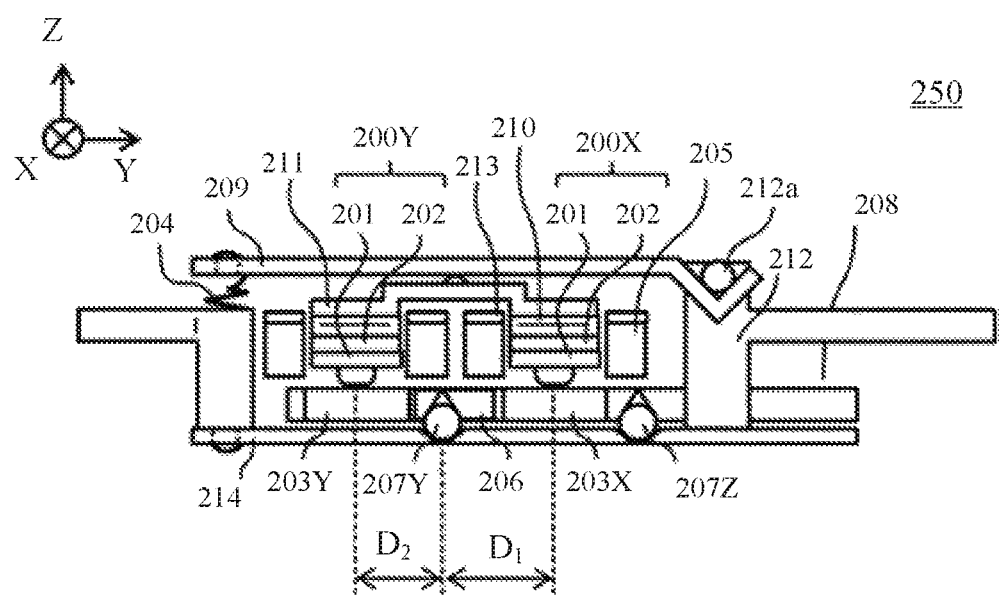
Figure 7A:
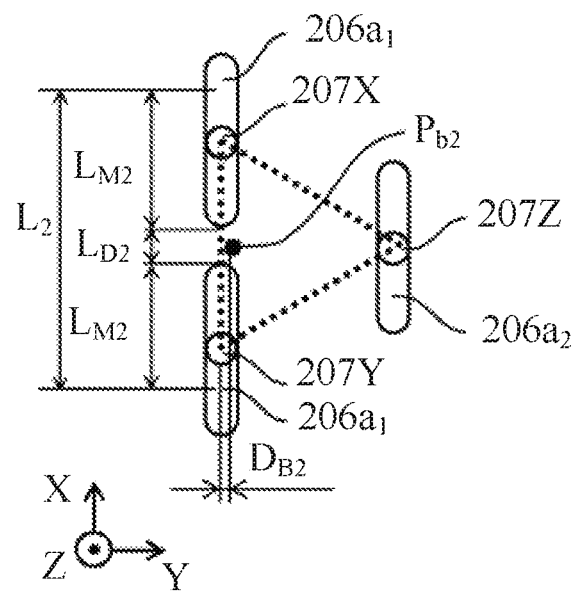
FIGS. 7A to 7C are explanatory views of the position of the guide member according to the second embodiment.
Figures 7B, 7C:
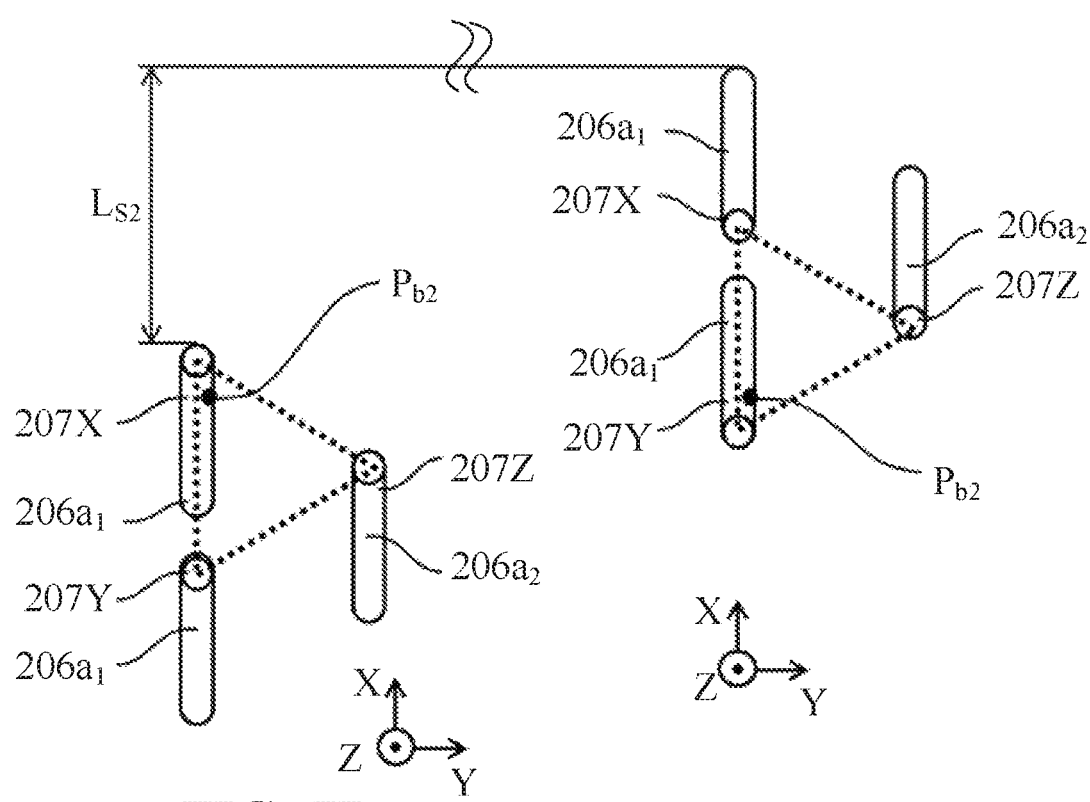

FIGS. 6A to 6C are explanatory views of the positions of the guide members 207X, 207Y, and 207Z according to this embodiment. FIGS. 6A and 6B are top views of an ultrasonic motor 250, FIG. 6C is its front view, and these figures correspond to FIGS. 2A to 2C. FIGS. 7A to 7C are explanatory views of the relationship between a range (relative movement range) $L_{S2}$ of the ultrasonic motor 250 and the length of the movable side guide groove 906a. FIGS. 7A to 7C are top views corresponding to FIGS. 4A to 4C.

The ultrasonic motor 250 according to this embodiment has the vibrators 200X and 200Y, the friction members 203X and 203Y, a movable side plate 206, a fixed side plate 214, and a base member 208. The ultrasonic motor 250 has three guide members 207X, 207Y and 207Z while the two guide members 207X and 207Y are located between the vibrators 200X and 200Y. As illustrated in FIG. 6C, a distance $D_1$ in the Y direction between each of the guide members 207X and 207Y and the vibrator 200X is larger than a distance $D_2$ in the Y direction between each of the guide members 207X and 207Y and the vibrator 200Y (D1>D2). As illustrated in FIGS. 6A and 6B, the guide members 207X, 207Y and 207Z are arranged such that the resultant force (pressurizing center) $P_{b2}$ is located inside a triangular area G made by connecting the guide members 207X, 207Y and 207Z, in the entire drive range $L_{S2}$.

In the comparative example illustrated in FIGS. 9A to 9C, the resultant force (pressure center) $P_{b9}$ and the two movable side guide grooves $906a_1$ are separated by the distance $D_{B9}$ in the orthogonal direction (V direction), and the two movable side guide grooves $906a_1$ need to be separated by the distance $L_{D9}$. On the other hand, this embodiment provides the guide grooves 207X and 207Y between the vibrators 200X and 200Y. Therefore, the distance $D_{B2}$ between the resultant force (pressure center) $P_{b2}$ and each of the two movable side guide grooves $206a_1$ can be made smaller, and the distance $L_{D2}$ between the two movable side guide grooves $206a_1$ can be made smaller. Hence, the occupancy range $L_2$ of the movable side guide groove $206a_1$ can be made narrower (which is expressed by $L_2=2\times L_{M2}+L_{D2}$ using the length $L_{M2}$ of the two movable side guide grooves $206a_1$ and the distance $L_{D2}$ between the two movable side guide grooves $206a_1$). In other words, the occupancy range of the guide groove in the moving direction can be made smaller for the miniaturization in the moving direction. This embodiment provides the three guide members 207X, 207Y, and 207Z, receives the pressure of the pressure member 204, and has a meritorious effect of the stable orientation of the base member 208.

Third Embodiment

Figure 10:
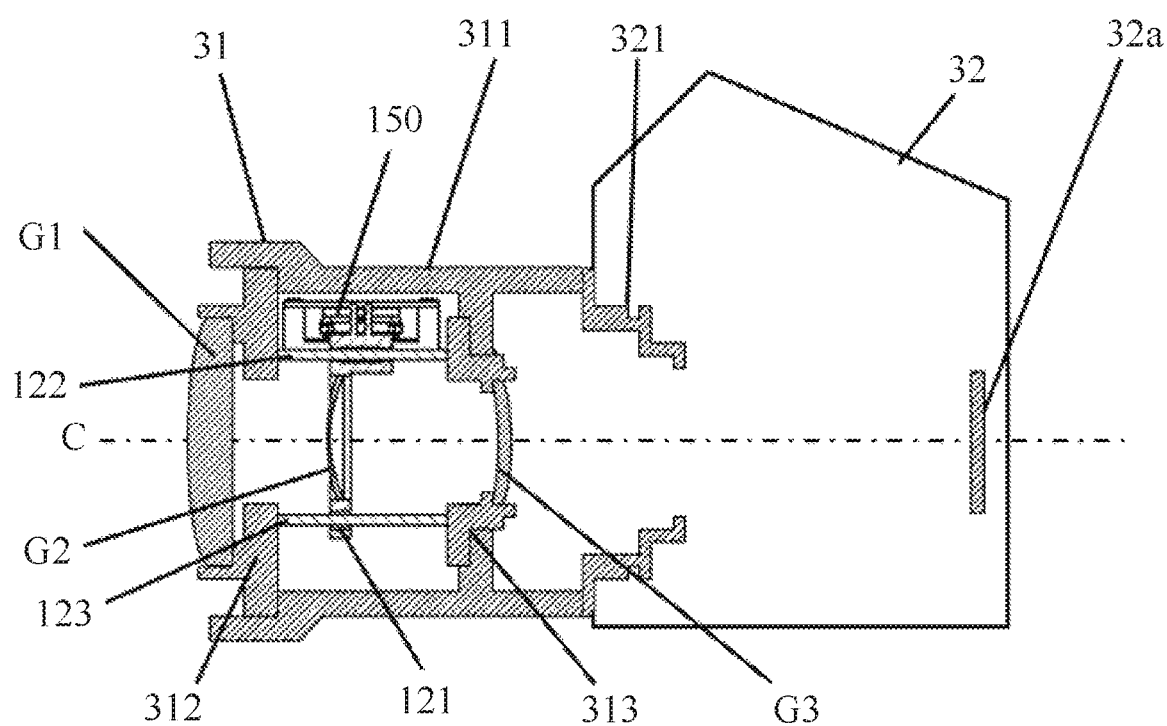
FIG. 10 are structural views of an imaging apparatus according to a third embodiment.

Referring now to FIG. 10, a description will be given of an imaging apparatus according to a third embodiment of the present invention. FIG. 10 illustrates a configuration (sectional view) of an imaging device 3. The imaging device 3 includes the ultrasonic motor, such as the ultrasonic motor 150 of each of the above embodiments. The imaging device 3 includes a camera body (imaging apparatus body) 32 and a lens barrel (lens apparatus) 31 attachable to and detachable from the camera body 32. However, this embodiment is not limited to this example, and is applicable to an imaging apparatus in which a camera body and a lens barrel are integrated with each other.

The camera body 32 includes an image sensor 32a. The image sensor 32a includes a CMOS sensor or a CCD sensor, photoelectrically converts an optical image (object image) formed by the imaging optical system (lenses G1, G2, and G3) in the lens barrel 31, and outputs image data. A mount 321 on the camera body 32 has a bayonet portion used to attach the lens barrel 31 to the camera body 32.

The lens barrel 31 has a fixed barrel 311 that contacts a flange portion in the mount 321. The fixed barrel 311 and the mount 321 are fixed by an illustrated screw. A front barrel 312 for holding the lens G1 and a rear barrel 313 for holding the lens G3 are fixed onto the fixed barrel 311. The lens barrel 31 includes a lens holding frame 314 that holds the lens G2. The lens holding frame 314 is linearly movably held by a first guide bar 122. held by the front barrel 312 and the rear barrel 313. The ultrasonic motor 150 is fixed onto the rear barrel 313 by unillustrated screws or the like. This configuration transmits the driving force of the ultrasonic motor 150 to the lens holder 121 when the vibrator in the ultrasonic motor 150 vibrates. Then, the lens holder 121 linearly moves in a direction along an optical axis C while guided by the first guide bar 122.

Each embodiment spaces the first and second vibrators (vibrators 100X and 100Y) in a direction (which is preferably a direction (Y direction) orthogonal to the relative movement direction) different from the relative movement direction (X direction) between the first and second vibrators and the friction members 103X and 103Y. The first and second guide members (guide members 107X and 107Y) are provided between the first and second vibrators in the direction different from the relative movement direction (X direction). The ultrasonic motor according to each embodiment can reduce the occupancy range of the guide groove and thereby size in the moving direction. Therefore, each embodiment can provide a compact ultrasonic motor, lens apparatus, and imaging apparatus.

The third embodiment drives the imaging optical system (lens) by the vibration type motor, but may drive a component other than the imaging optical system (lens) in the imaging apparatus. For example, the image sensor is set to a target to be driven and the above vibration type motor may be used to drive the image sensor in a direction orthogonal to the optical axis in the imaging optical system. The electronic apparatus to which the present invention is applicable is not limited to the imaging apparatus, but the above vibration type motor may be used to drive a component as the target to be driven in an electronic apparatus other than the imaging apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the ultrasonic motor according to each embodiment is not limited to the lens apparatus, and is applicable to another electronic apparatus that is required to be small and lightweight, and to have a wide driving speed range.

This application claims the benefit of Japanese Patent Application No. 2017-226466, filed on Nov. 27, 2017, which is hereby incorporated by reference herein in its entirety.

What is claimed is:

1. A vibration type motor comprising:
a first vibrator and a second vibrator;
a friction member configured to contact the first vibrator and the second vibrator;
a pressure member configured to press the first vibrator and the second vibrator against the friction member; and
a first guide member and a second guide member configured to guide a relative movement between the first and second vibrators and the friction member,
wherein the first vibrator and the second vibrator are spaced in a direction different from a relative movement direction between the first and second vibrators and the friction member,
wherein the first guide member and the second guide member are provided between the first vibrator and the second vibrator in a direction different from the relative movement direction, the first guide member and the second guide member being arranged side by side in the relative movement direction and
wherein a pressure center of a pressure applied to the first vibrator and the second vibrator by the pressure member is located between the first guide member and the second guide member.

2. The vibration type motor according to claim 1, wherein in a range of the relative movement between the first and second vibrators and the friction member, the pressure center of the pressure applied to the first and second vibrators by the pressure member is located between the first guide member and the second guide member.

3. The vibration type motor according to claim 1, wherein the first vibrator and the second vibrator are spaced from each other in a direction orthogonal to the relative movement direction.

4. The vibration type motor according to claim 1, wherein the first guide member and the second guide member are spaced from each other in the relative movement direction.

5. The vibration type motor according to claim 1, wherein each of the first vibrator and the second vibrator includes a piezoelectric element and a vibration plate having a protrusion, and the friction member contacts the protrusion of each of the first vibrator and the second vibrator.

6. The vibrating motor according to claim 1, further comprising a guide plate configured to contact the first guide member and the second guide member and integrated with the friction member,
wherein the friction member comprises a first friction member configured to contact the first vibrator and a second friction member configured to contact the second vibrator, and
wherein the guide plate is provided between the first friction member and the second friction member.

7. The vibration type motor according to claim 6, wherein when viewed from a direction orthogonal to a direction in which the pressure member presses the first vibrator and the second vibrator, at least part of the guide plate overlaps at least part of the first friction member and the second friction member.

8. The vibration type motor according to claim 6, further comprising a fixed plate,
wherein the first guide member and the second guide member are held so that the first guide member and the second guide member roll between a first groove formed in the guide plate and a second groove formed in the fixed plate,
wherein each of the first groove and the second groove has a V-shaped, and
wherein an angle formed by the first groove is smaller than that formed by the second groove.

9. The vibration type motor according to claim 1, wherein a distance between the first guide member and the first vibrator is equal to a distance between the first guide member and the second vibrator in a direction orthogonal to the relative movement direction, and a distance between the second guide member and the first vibrator is equal to a distance between the second guide member and the second vibrator.

10. A lens apparatus comprising:
the vibration type motor according to claim 1; and
an optical system driven by the vibration type motor.

11. An electronic apparatus comprising:
the vibration type motor according to claim 1; and
a target driven by the vibration type motor.

* * * * *